(12) United States Patent
Stoker

(10) Patent No.: US 11,224,923 B2
(45) Date of Patent: Jan. 18, 2022

(54) TOOL HOLDER FOR A MACHINE TOOL

(71) Applicant: C. & E. Fein GmbH, Schwaebisch Gmuend-Bargau (DE)

(72) Inventor: Kristopher Stoker, Long Grove, IA (US)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 410 days.

(21) Appl. No.: 16/259,274

(22) Filed: Jan. 28, 2019

(65) Prior Publication Data
US 2020/0238395 A1    Jul. 30, 2020

(51) Int. Cl.
| | |
|---|---|
| B23B 31/107 | (2006.01) |
| B23B 27/00 | (2006.01) |
| B23B 31/06 | (2006.01) |
| B23Q 3/12 | (2006.01) |

(52) U.S. Cl.
CPC ........ *B23B 31/1078* (2013.01); *B23B 27/002* (2013.01); *B23B 31/06* (2013.01); *B23Q 3/12* (2013.01); *B23B 2231/04* (2013.01)

(58) Field of Classification Search
CPC ....... B25B 23/08; B25B 23/10; B25B 23/108; B25B 23/0035; B25B 23/0007; B23B 31/107; B23B 31/1071; B23B 31/1078; B23B 31/06; B23B 27/002; B23B 2231/04; Y10T 279/17811; B23Q 3/12
See application file for complete search history.

(56) References Cited

U.S. PATENT DOCUMENTS

| | | | |
|---|---|---|---|
| 2,327,074 A * | 8/1943 | Snyder | B25B 23/10 81/57.37 |
| 5,427,482 A | 6/1995 | Asano et al. | |
| 5,429,457 A | 7/1995 | Asano et al. | |

(Continued)

FOREIGN PATENT DOCUMENTS

| | | |
|---|---|---|
| DE | 102016115094 A1 | 2/2018 |
| EP | 0722798 A1 | 7/1996 |

(Continued)

OTHER PUBLICATIONS

Extended European Search Report for European Application No. 20152087.1 dated Jul. 3, 2020—English translation.

*Primary Examiner* — Seahee Hong
(74) *Attorney, Agent, or Firm* — Muncy, Geissler, Olds & Lowe, P.C.

(57) ABSTRACT

A tool holder for a machine tool, in particular for a core drilling machine, having a hollow shaft which has, at one end for coupling to the drive of the machine tool, a connector and, at the other end, a receiving opening with a plurality of openings in which locking elements are accommodated which are radially adjustable between a clamping position and an release position for securing a tool accommodated in the receiving opening. A switching sleeve is provided, which is adjustably mounted on the hollow shaft between a first switching position and a second switching position, a first subset of the locking elements being provided in the first switching position for locking the tool in the receiving opening, and a second subset of the locking elements being provided in the second switching position for locking the tool in the receiving opening, while the adjustment of the respective remaining locking elements is deactivated.

15 Claims, 4 Drawing Sheets

(56) References Cited

U.S. PATENT DOCUMENTS

| | | | |
|---|---|---|---|
| 6,311,989 B1* | 11/2001 | Rosanwo | B25B 23/0035 |
| | | | 279/75 |
| 7,370,561 B2 | 5/2008 | Mikiya et al. | |
| 7,494,306 B2 | 2/2009 | Sihmada | |
| 7,862,267 B2 | 1/2011 | Shimada | |
| 8,016,523 B2* | 9/2011 | Vasudeva | B25B 23/0035 |
| | | | 408/226 |
| 8,371,775 B2 | 2/2013 | Miyanaga | |
| 8,876,120 B2* | 11/2014 | Chen | B25B 23/0035 |
| | | | 279/30 |
| 9,731,356 B2* | 8/2017 | Cornwell | B23B 31/107 |
| 2014/0312577 A1* | 10/2014 | Schneider | B23B 31/1071 |
| | | | 279/22 |
| 2018/0185995 A1* | 7/2018 | Shu | B25B 23/0035 |

FOREIGN PATENT DOCUMENTS

| | | |
|---|---|---|
| EP | 1655167 A1 | 5/2006 |
| EP | 2030708 A1 | 3/2009 |
| EP | 2045037 A1 | 4/2009 |
| EP | 2826579 A1 | 1/2015 |
| WO | WO 2020/077143 A1 | 4/2020 |

\* cited by examiner

TOOL HOLDER FOR A MACHINE TOOL

BACKGROUND OF THE INVENTION

Field of the Invention

The invention relates to a tool holder for a machine tool, in particular for a core drilling machine, having a hollow shaft which has, at one end for coupling to the drive of the machine tool, a connector and, at the other end, a receiving opening with a plurality of openings in which locking elements are accommodated which are radially adjustable between a clamping position and an release position for securing a tool accommodated in the receiving opening.

Description of the Background Art

Tool holders are usually used on machine tools, such as core drilling machines, to fix different tools in the receiving opening of the tool holder and to lock or clamp them therein by means of the locking elements. If, for example, another tool is to be clamped, the already clamped tool can be easily exchanged for the new tool by adjusting the locking elements from the clamping position to the release position. These tool holders be can either formed as a separate part in the form of an arbor or as an integral part of the machine tool in the form of a spindle.

However, depending on the manufacturer of the tools, there are differently designed tool shanks, which differ in particular with regard to the tool-side locking element receptacles in which the locking elements of the tool holder engage in order to secure the tool in the tool holder. This is why there are many different tool holders with individual clamping systems from different manufacturers, so that when a tool from another manufacturer shall be used, the tool holder itself has to be exchanged, which means a considerable amount of setup expenditure.

DE 10 2016 115 094 A1, which is incorporated herein by reference, provides a tool holder, by means of which different tools from different manufacturers with different diameters can be clamped in a single tool holder.

In the conventional art, the mechanism for clamping different tools has proved itself in principle, its implementation is constructively quite complex. In addition, it has been shown that the need to clamp tools with different diameters is increasingly reduced as more and more manufacturers use a standard diameter for the tool shank.

SUMMARY OF THE INVENTION

It is therefore an object of the present invention to reduce the disadvantages mentioned above and to provide a tool holder, by means of which tools from different manufacturers can be easily clamped and which enables simple handling.

According to an exemplary embodiment of the invention, this task is solved with a tool holder of the type mentioned at the beginning by providing a switching sleeve, which is adjustably mounted on the hollow shaft between a first switching position and a second switching position, a first subset of the locking elements being provided in the first switching position for locking the tool in the receiving opening, and a second subset of the locking elements being provided in the second switching position for locking the tool in the receiving opening, while the adjustment of the respective remaining locking elements is deactivated.

This means that it is possible to clamp or mount different tools with differently positioned locking element receptacles on the tool shank with a single tool holder, allowing it for the user to mount tools from different manufacturers with only one tool holder, without changing the tool holder itself. The locking elements are preferably located in a single plane perpendicular to the longitudinal axis of the hollow shaft. The adjustment of the switching sleeve is preferably achieved by turning the sleeve.

It has also been shown to be particularly favorable if the switching sleeve has at least one switching receiver for receiving the deactivated locking elements. The switching receiver ultimately ensures that the locking elements that are not required for clamping the respective tool in the tool holder can remain in the release position. In the context of this invention, it has proved to be particularly effective if the switching receiver is provided twofold and if the angle between the first switching receiver and the second switching receiver is 60°. This allows for clamping a large variety of tools available on the market in the tool holder according to the invention and at the same time the switching sleeve has to be adjusted only over a comparatively small angular range in order to adjust the switching sleeve between the first and the second switching position. In particular, the switching sleeve can have a switching contour in the form of a collar, by means of which it is possible to move the locking elements radially inwards into the locking position. In particular, this collar can also be used to accommodate the switching receiver, in which the deactivated locking elements can be accommodated. This collar can advantageously be arranged on the inner circumferential side at the end of the switching sleeve facing the muzzle of the receiving opening.

It has been shown to be particularly favorable if the sum of the first subset of locking elements and the second subset of locking elements is greater than the total number of locking elements. In other words, this means that at least one of the locking elements is used in both the first and the second switching positions to secure the tool in the tool holder. By using at least one of the locking elements in both switching positions to clamp the tool in the tool holder, it is achieved that the switching sleeve only has to be adjusted by a comparatively small angular range in order to clamp tools from different manufacturers that have different positions of the locking element receptacles on the tool side.

It has also been shown to be advantageous if three locking elements are provided, an angle of 90° being formed between the first locking element and the second locking element and an angle of 120° being formed between the second locking element and the third locking element. This allows a particularly large variety of tools to be clamped. In this context, it has been further proven advantageously if the first subset of the locking elements is formed by the first locking element and the second locking element and that the second subset of the locking elements is formed by the second locking element and the third locking element. This allows tools to be clamped whose locking element receptacles are either 90° or 120° separated from each other. In particular, two locking elements are sufficient to secure a tool securely in the tool holder.

It has also proved to be advantageous if a setting sleeve is provided by means of which the switching sleeve can be axially adjusted between a freeing position releasing the locking elements and a locking position transferring the locking elements from the release position into the clamping position. In this context, it has also been shown to be advantageous if the setting sleeve is non-rotatably connected to the switching sleeve via a pin. This makes it particularly easy to connect the setting sleeve and the switching sleeve. As the switching sleeve and the setting sleeve are rotationally coupled, it is possible for the user to adjust the switching sleeve between the first and the second position by rotating the setting sleeve. Hence, by means of the setting sleeve it is possible for the user to both rotate and axially adjust the position of the switching sleeve.

However, it has also proven to be particularly advantageous if the setting sleeve is rotatably mounted on the hollow shaft in a limited way. If the switching sleeve and the setting sleeve are rotationally connected, this allows for a positioning of the switching sleeve between the first and the second switching positions in a defined manner.

A particularly simple operation of the tool holder can be achieved if the switching sleeve is mounted on the outer circumference of the hollow shaft axially adjustable from the locking position into the freeing position against the force of a spring element. On the one hand, this means that the switching sleeve is automatically transferred from the freeing position to the locking position, so that the user does not have to take any further action to clamp the tool in the receiving opening of the tool holder. In addition, this also increases the operational reliability of the tool holder, as it ensures that the switching sleeve is always pushed by the spring element, which can be a spring, in the direction of the locking position.

In this context, it has also proved to be favorable if a retainer, which is spring-loaded by a spring in the direction of the muzzle of the receiving opening, may be provided in the receiving opening. With this retainer it is possible to hold the locking elements in the release position so that a tool can simply be inserted into the tool holder. In this context, it has proved particularly useful if the locking elements in the release position hold the switching sleeve in its freeing position. If the tool is inserted into the tool holder, the retainer moves axially away from the muzzle of the receiving opening, which frees the locking elements. This allows for the switching sleeve to be transferred from the freeing position to the locking position, by which the first or second subset of locking elements is radially adjusted from the release position to the clamping position.

The removal of the slug out of the cutter after cutting the hole is facilitated if an axially adjustable ejector is arranged in the hollow shaft and is spring-loaded by an elastic resetting element in the direction of the receiving opening. By means of this it is possible to receive the pilot pin in an axially adjustable manner. After the cutting process the spring-loaded ejector drives the pilot pin into the direction of to muzzle of the receiving opening to eject the slug out of the cutter after cutting the hole.

It has also proven to be advantageous if the locking elements each have a cylindrical section and a spherical section for interaction with corresponding tool-side locking element receptacles. The cylindrical sections allow the locking elements to be guided within the receiving openings and the spherical sections interact with the locking element receptacles on the tool-side and ensure the locking of the tool in the receiving opening.

It has also been shown to be favorable if a mounting for a coupling member can be formed in the setting sleeve, which is formed in such a way that the coupling member emerges at least partially radially on the inside of the setting sleeve facing the hollow shaft. In particular, this coupling member ensures that the setting sleeve is guided along the hollow shaft. However, it is also possible that the coupling member is mounted on the switching sleeve.

Further, a control cam, which is delimited by stops defining the first switching position and the second switching position, can be formed on the outer circumference of the hollow shaft for receiving the coupling member. This ensures that the adjustment of the setting sleeve is limited. In addition, the arrangement of the control cam relative to the stops also ensures that adjustment of the switching sleeve between the first and the second switching position can only take place in the, for example, freeing position.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
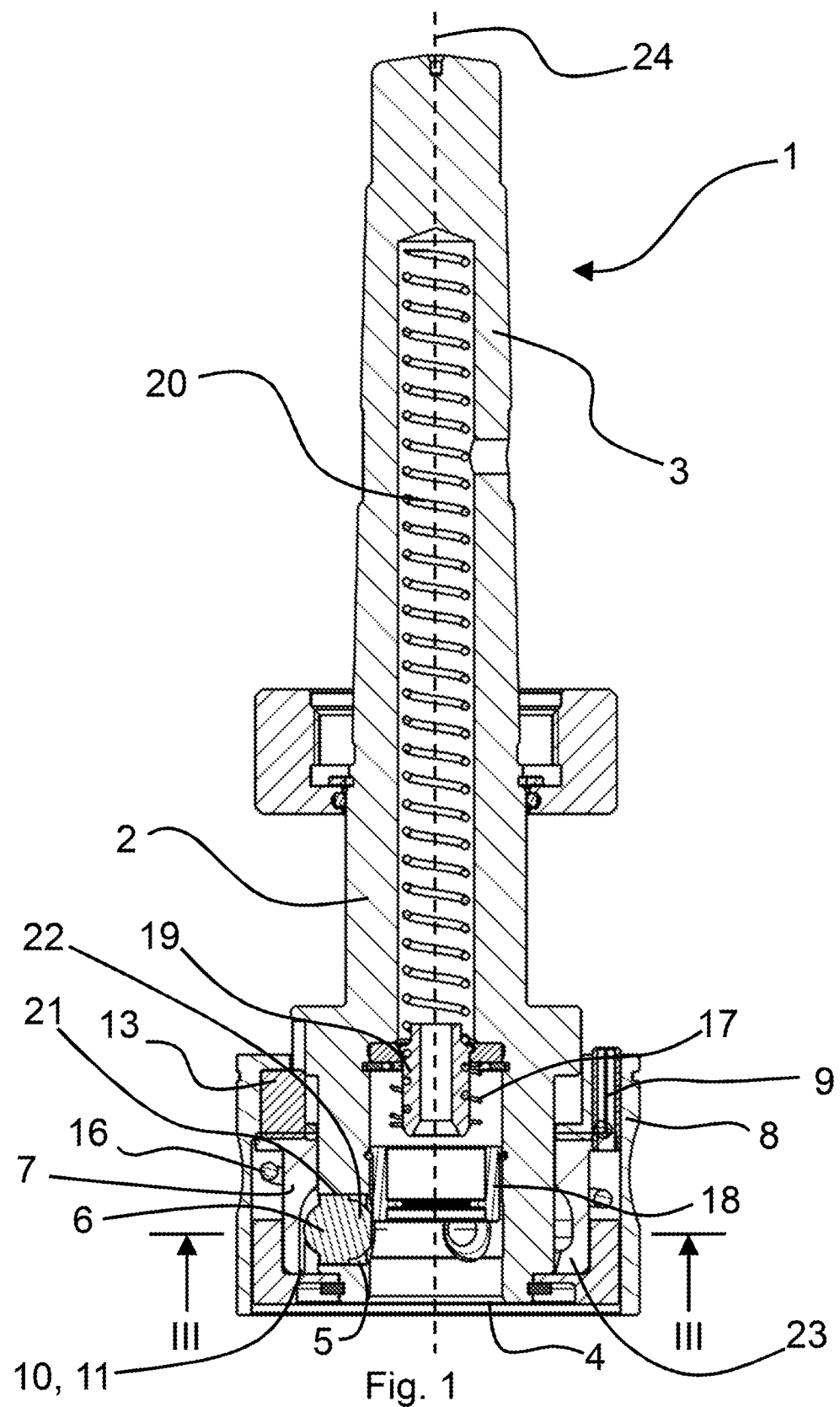
FIG. 1 shows a longitudinal section through a tool holder with a switching sleeve in the freeing position.

FIG. 1 shows a longitudinal section of a tool holder 1 for a magnetic core drilling machine. The tool holder 1 has a hollow shaft 2, which has at one end a connector 3 for connecting the tool holder 1 to the machine tool and which has at the other end a receiving opening 4, in which a tool can be inserted. Several openings 5 are formed in the receiving opening 4, in which locking elements 6 are accommodated. These are radially adjustable between a clamping position and an release position in order to secure or release a tool accommodated in the receiving opening 4. In addition, the tool holder 1 has a switching sleeve 7, which is rotatably mounted on the hollow shaft 2 and is non-rotatably connected via a pin 9 to a setting sleeve 8, which can be gripped by the user. The switching sleeve 7 can be rotated to a limited extent relative to the hollow shaft 2 via the setting sleeve 8 between a first switching position and a second switching position. In the first switching position, a first subset of the locking elements 6 is provided for locking the tool in the receiving opening 4. In the second switching position of the switching sleeve 7, the tool can then locked in the receiving opening 4 via a second subset of the locking elements 6. In the first switching position or the second switching position, the adjustment of the remaining locking elements 6 is deactivated. On the other hand, the switching sleeve 7 can also be adjusted axially along a longitudinal axis 24 of the hollow shaft 2 via the setting sleeve 8 from a freeing position shown in FIG. 1, in which the locking elements 6 can move radially outwards from the clamping position into the release position, and a locking position shown in FIG. 2, in which the locking elements 6 provided for securing the tool in the receiving opening 4 are transferred by the switching sleeve 7 into the clamping position. Therefore, in the freeing position a tool can be inserted into or removed from the receiving opening 4, as the locking elements 6 can be radially adjusted outwards into the release position. In the freeing position of the switching sleeve 7, shown in FIG. 1, the locking elements 6 are radially adjusted outwards and are held in this release position by a retainer 18. In this configuration the switching sleeve 7 is also hold by the locking elements 6 in the freeing position.

Figure 2:
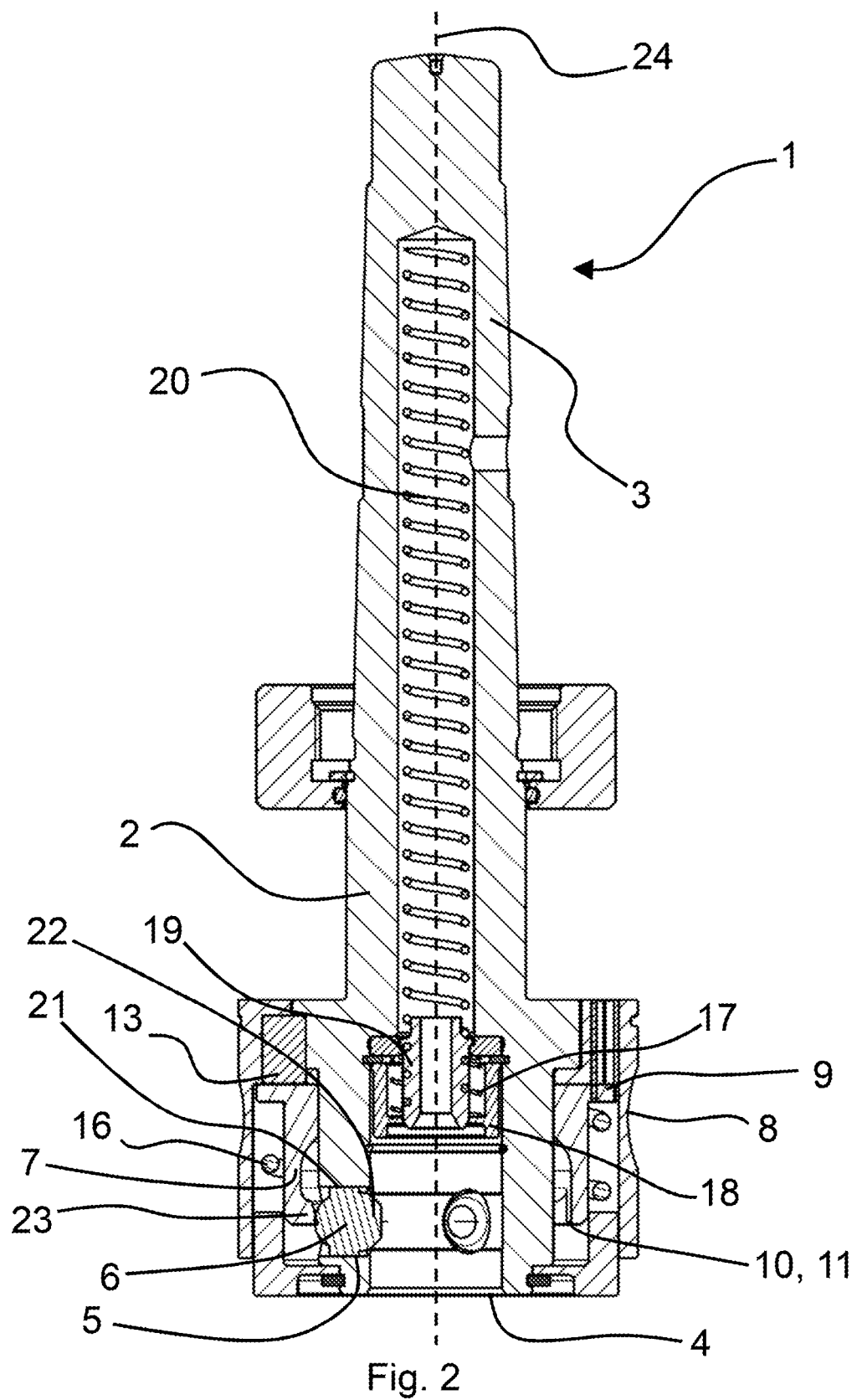
FIG. 2 illustrates a longitudinal section through the tool holder with the switching sleeve in locking position.

In the locking position of the switching sleeve 7, which is shown in FIG. 2, the first or second subset of the locking elements 6 are transferred to the clamping position—depending on the first or second switching position of the switching sleeve 7—if the retainer 18 has previously been axially displaced away from the muzzle of the receiving opening 4. For a better overview, FIG. 2 does not show a tool within the receiving opening 4. To adjust the locking elements 6, which have a cylindrical section 21 and a spherical section 22, the switching sleeve 7 has an inwardly pointing collar 23. This collar 23 acts on the locking elements 6 to move them from the release position to the clamping position. In order to deactivate the adjustment of one of the locking elements 6 from the release position into the clamping position, recesses are formed in the collar 23 of the switching sleeve 7 forming a first switching receiver 10 and a second switching receiver 11, in each of which the deactivated locking element 6 can be accommodated when the switching sleeve 7 is in the first or second switching position.

The switching sleeve 7 is mounted on the outer circumference of the hollow shaft 2 against the force of a spring element 16, which acts in the direction of the locking position, i.e. away from the muzzle of the receiving opening 4. This ensures that the switching sleeve 7 is always forced in the direction of the locking position, which increases the operational reliability of the tool holder 1, as this prevents unintentional opening of the switching sleeve 7. The retainer 18 mounted in the receiving opening 4 is axially displaceable along the longitudinal axis 24 of the hollow shaft 2 against the force of a return spring 17. The return spring 17 acts in the direction of the muzzle of the receiving opening 4, whereby the retainer 18 ensures that the locking elements 6 are moved radially outwards into the release position if the switching sleeve 7 is in its freeing position. In addition, an axially adjustable ejector 19 is arranged in the hollow shaft 2, upon which an elastic resetting element 20 acts in the direction of the receiving opening 4. This ejector 19 is automatically displaced by the pilot pin used in the cutting process and ejects the slug out of the cutter after cutting the hole.

Figure 3:
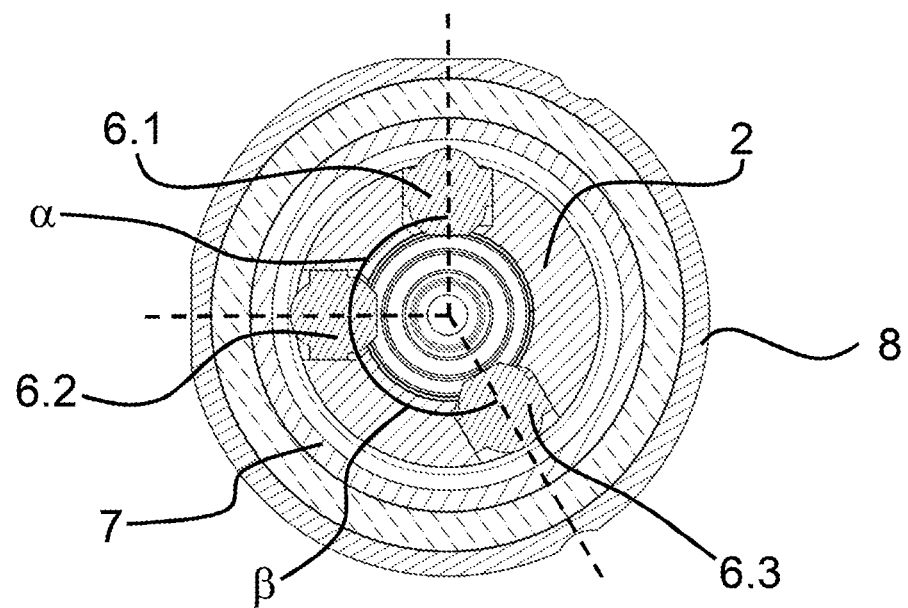
FIG. 3 is a cross-section along the section III-III from FIG. 1.

The sectional view displayed in FIG. 3 also shows that three locking elements 6 are provided, with an angle α of 90° between the first locking element 6.1 and the second locking element 6.2 and an angle α of 120° formed between the second locking element 6.2 and the third locking element 6.3. Thus, in the example shown, the first subset of the locking elements 6 is formed from the first locking element 6.1 and the second locking element 6.2. The second subset of the locking elements 6, on the other hand, consists of the second locking element 6.2 and the third locking element 6.3. This ultimately results in the fact that the sum of the first subset of the locking elements 6 and the second subset of the locking elements 6 is greater than the total number of locking elements 6. In other words, one of the three locking elements 6 is used both in the first and in the second switching position for securing the tool in the receiving opening 4. Since only two of the locking elements 6 are used to lock a tool in the receiving opening 4, it is possible to clamp tools whose corresponding locking element receptacles for the locking elements 6 are either 90° or 120° offset from each other.

Figure 6:
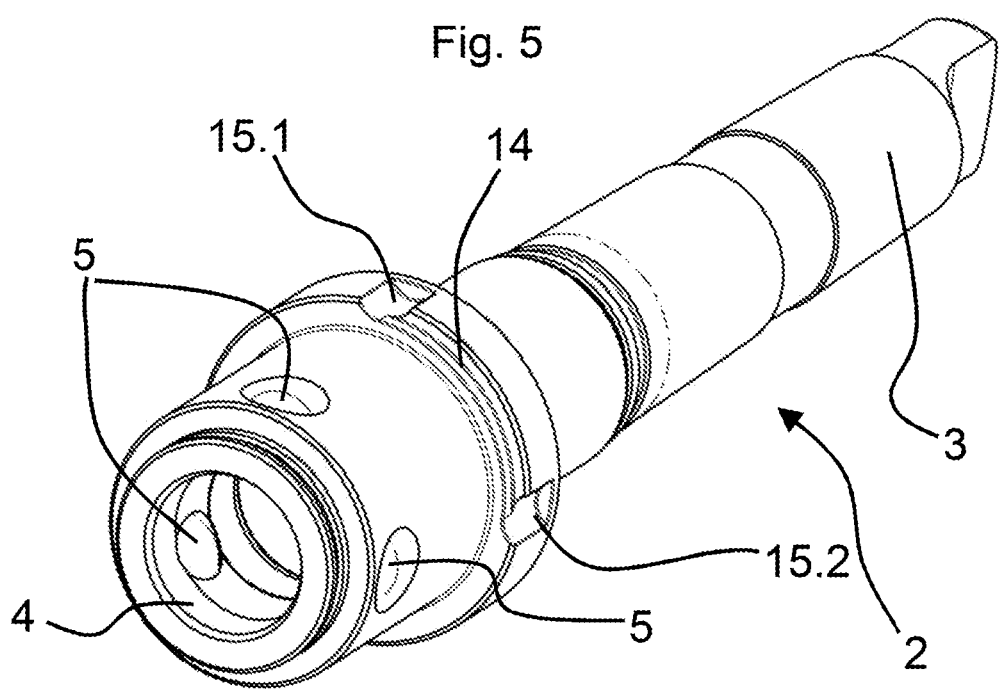
FIG. 6 is a perspective view of a hollow shaft.

In the tool holder 1 shown, the setting sleeve 8 is rotatably mounted on the hollow shaft 2 in a limited way. For this purpose, a mounting 12 for a coupling member 13 is provided in the setting sleeve 8. The mounting 12 is designed in such a way that the coupling element 13 exits at least partially radially on the inner side of the setting sleeve 8 facing the hollow shaft 2. This makes it possible to guide the coupling element 13, which is formed as a cylinder, in a control cam 14 formed on the outer circumference of the hollow shaft 2, as shown in FIG. 6. This control cam 14 is limited by stops 15.1 and 15.2, which define the first switching position and the second switching position of the switching sleeve 7. As can also be seen from FIG. 6, the stops 15 are arranged in such a way relative to the control cam 14 that the rotation of the switching sleeve 7 between the first and second switching position is only possible if the switching sleeve 7 is at the same time in the freeing position, i.e. when the switching sleeve 7 is axially adjusted in the direction of the receiving opening 4.

Figure 4:
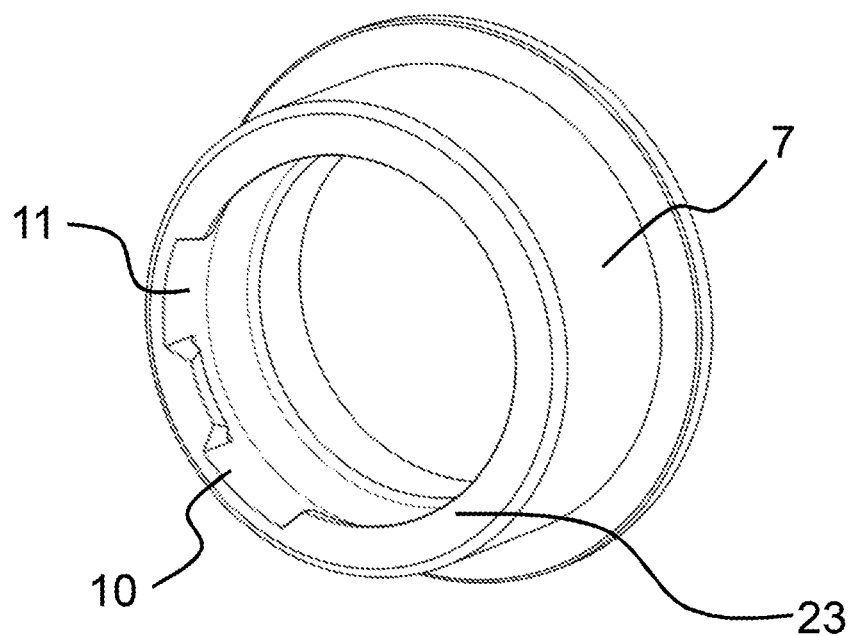
FIG. 4 is a perspective view of the switching sleeve.

FIG. 4 shows the switching sleeve 7 in a perspective view. In particular, the collar 23, which is interrupted by the switching receivers 10, 11, can also be seen. In the displayed example, the angle between the first switching receiver 10 and the second switching receiver 11 is 60°.

Figure 5:
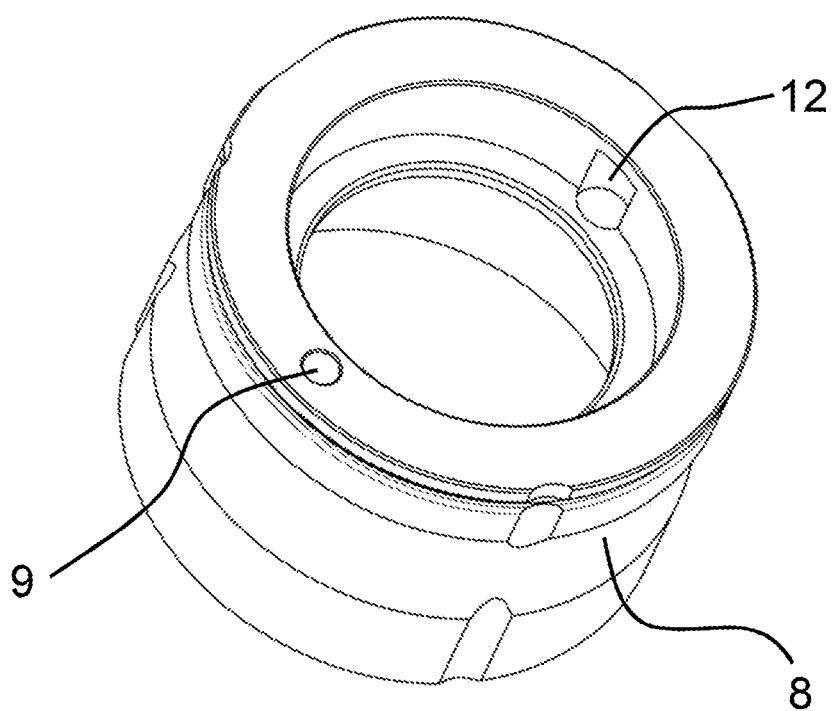
FIG. 5 is a perspective view of a setting sleeve.

FIG. 5 shows in a perspective view the setting sleeve 8 with the mounting 12, which opens on the inner circumference of the setting sleeve 8. The mounting 12 houses the coupling element 13 which is guided in the control cam 14 formed in the hollow shaft 2. As can be seen from FIG. 6, which shows the hollow shaft 2 in a perspective illustration, the control cam 14 is limited by the stops 15.

In the following, the function of the invented tool holder 1 is described once again in detail, starting from the freeing position of the switching sleeve 7 shown in FIG. 1. In the freeing position of the switching sleeve 7, the locking elements 6 are moved radially outwards to the release position by the retainer 18, which is driven by the return spring 17 in the direction of the receiving opening 4. In this configuration the locking elements 6 secure the switching sleeve 7 in the release position. If now a tool is inserted into the receiving opening 4 of the hollow shaft 2, it first comes into contact with the retainer 18, which is then axially displaced in the hollow shaft 2 against the force of the return spring 17. This allows the locking elements 6, which were previously held in the release position by the retainer 18, to be radially adjusted inward to secure the tool in the receiving opening 4. This adjustment of the locking elements 6 is effected by the axial displacement of the switching sleeve 7 away from the muzzle of the receiving opening 4, which is driven by the spring element 16. The locking elements 6 are displaced by the collar 23 of the switching sleeve 7 when it moves axially from the freeing position to the locking position displayed in FIG. 2. In this state, the ejector 19 is also axially displaced by the pilot pin of the core drill, which is not displayed, away from the receiving opening 4 against the force of the resetting element 20, which is formed by a spring.

If the user wants to remove the tool from the tool holder 1, he simply has to displace the setting sleeve 8, which is connected to the switching sleeve 7 via the pin 9, axially towards the muzzle of the receiving opening 4, whereby the locking elements 6 are released and the tool located in the receiving opening 4 can be removed from the tool holder 1. The spring-loaded ejector 19 receives the pilot pin, which ejects the slug out of the cutter after cutting the hole. The retainer 18 moves simultaneously, supported by the spring 17 towards the muzzle of the receiving opening 4 and holds the locking elements 6 in the release position. In the displayed example, the switching sleeve 7 can be rotated on the hollow shaft 2 by an angle of 90° between the first and second switching positions to activate either the first or second subset of locking elements 6 in order to clamp different tools within the tool holder 1. However, as can be seen in particular from FIG. 6, this adjustment between the first and second switching position can only be carried out if the switching sleeve 7 is in its freeing position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A tool holder for a machine tool, the tool holder comprising:
    a hollow shaft that has, at a first end for coupling to a drive of the machine tool, a connector and, at a second end, a receiving opening with a plurality of openings in which locking elements are accommodated that are radially adjustable between a clamping position and a release position for securing the machine tool in the receiving openings; and
    a switching sleeve that is adjustably mounted on the hollow shaft configured to alternately switch between a first switching position and a second switching position, wherein the locking elements comprise a first subset of the locking elements and a second subset of the locking elements, wherein when the switching sleeve is placed in the first switching position, the first subset of the locking elements are configured to be in the first switching position for locking the machine tool in the receiving opening, when the switching sleeve is placed in the second switching position, the second subset of the locking elements are configured to be in the second switching position for locking the machine tool in the receiving opening while an adjustment of respective remaining locking elements is deactivated.

2. The tool holder according to claim 1, wherein the switching sleeve has at least one switching receiver for receiving the deactivated locking elements.

3. The tool holder according to claim 2, wherein the at least one switching receiver comprises a first switching receiver and a second switching receiver and wherein an angle between the first switching receiver and the second switching receiver is about 60°.

4. The tool holder according to claim 1, wherein a sum of the first subset of the locking elements and the second subset of the locking elements is greater than a total number of the locking elements.

5. The tool holder according to claim 1, wherein the locking elements comprise a first locking element, a second locking element and a third locking element, wherein an angle of 90° is formed between the first locking element and the second locking element and an angle of about 120° is formed between the second locking element and the third locking element.

6. The tool holder according to claim 5, wherein the first subset of the locking elements is formed by the first locking element and the second locking element, and wherein the second subset of the locking elements is formed by the second locking element and the third locking element.

7. The tool holder according to claim 1, wherein a setting sleeve is provided via which the switching sleeve is adapted to be axially adjusted between a freeing position releasing the locking elements and a locking position transferring the locking elements from the release position into the clamping position.

8. The tool holder according to claim 7, wherein the setting sleeve is non-rotatably connected to the switching sleeve via a pin.

9. The tool holder according to claim 7, wherein the setting sleeve is rotatably mounted on the hollow shaft in a limited way.

10. The tool holder according to claim 7, wherein the switching sleeve is mounted on an outer circumference of the hollow shaft axially adjustable from the locking position into the freeing position against a force of a spring element.

11. The tool holder according to claim 7, wherein a mounting for a coupling member is formed in the setting sleeve, which is formed such that the coupling member emerges at least partially radially on an inside of the setting sleeve facing the hollow shaft.

12. The tool holder according to claim 11, wherein a control cam, which is delimited by stops defining the first switching position and the second switching position, is formed on an outer circumference of the hollow shaft for receiving the coupling member.

13. The tool holder according to claim 1, wherein a retainer, which is spring-loaded by a spring in the direction of a muzzle of the receiving opening, is arranged in the receiving opening.

14. The tool holder according to claim 1, wherein an axially adjustable ejector is arranged in the hollow shaft and is spring-loaded by an elastic resetting element in a direction of the receiving opening.

15. The tool holder according to claim 1, wherein the locking elements each have a cylindrical section and a spherical section for interaction with corresponding tool-side locking element receptacles.

\* \* \* \* \*